INVENTOR.
DANTE J. DOMIZI

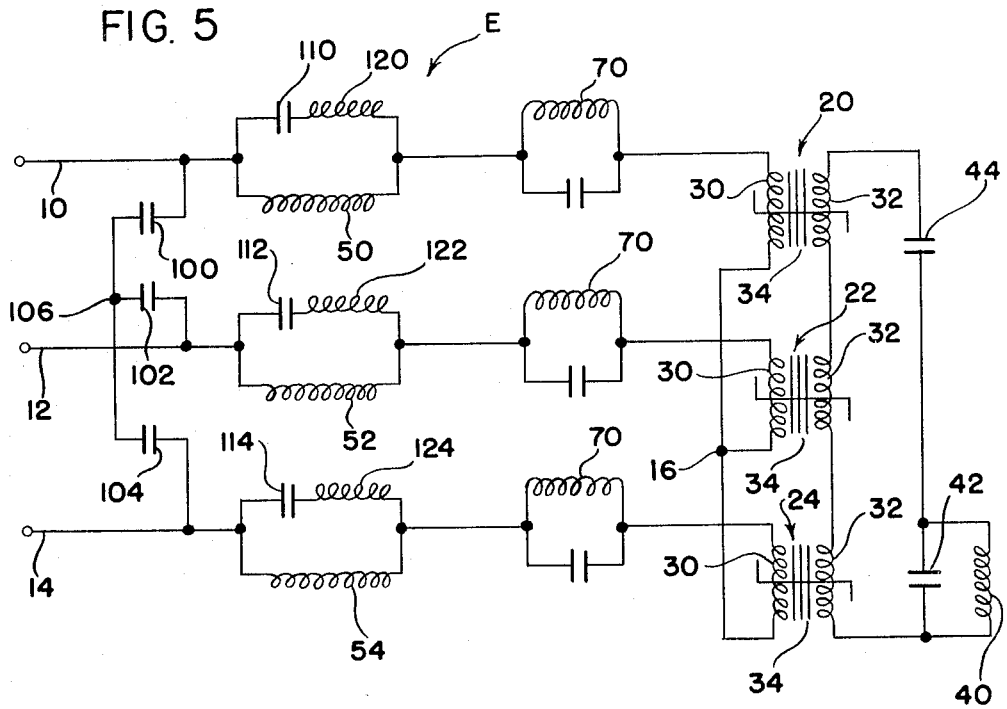

United States Patent Office 3,295,045
Patented Dec. 27, 1966

3,295,045
PHASE AND FREQUENCY CONVERSION SYSTEM
Dante J. Domizi, Parma, Ohio, assignor to The Ohio Crankshaft Company, Cleveland, Ohio, a corporation of Ohio
Filed June 21, 1963, Ser. No. 289,642
4 Claims. (Cl. 321—7)

The present invention pertains to the art of electrical power conversion and more particularly to a system for converting a multiphase power into a single phase power.

The present invention is particularly applicable to converting a three phase, 60 cycle power into a single phase, 180 cycle power for operating an induction heating furnace and the invention will be discussed with particular reference thereto; however, it is to be appreciated that the invention has much broader applications and may be employed to convert multiphase power of one frequency into a single phase power of a higher frequency for use in various electrical equipment, such as a high frequency fluorescent lighting system.

In the art of induction heating, as well as other electrical arts, there is a substantial need for converting the three phase, 60 cycle electrical power of the incoming power lines into a single phase power having a higher frequency, i.e. a frequency of 180 cycles per second, or greater. Increasing the frequency of the single phase power greatly enhances the operating characteristics of equipment driven thereby, which equipment may take the form of an induction heating furnace.

In the past, it was common practice to convert the three phase, 60 cycle incoming electrical power into a desired higher frequency, single phase power by rotary equipment, such as a motor-generator set wherein the motor was driven by the three phase incoming power and the generator, driven by the motor, had a single phase, high frequency power output. Such an arrangement has been found to be expensive and subject to intermittent maintenance costs. Consequently there has been a considerable amount of effort directed toward the development of static devices for converting the three phase incoming power into a single phase power that can be used in an induction heating installation.

This development work on static devices for converting three phase power into single phase power having a higher frequency resulted in a plurality of proposed devices. The most successful of these previous devices included a saturating transformer for each phase of the multiphase power wherein the primary winding of each transformer was connected into a separate phase of the multiphase power and the secondary windings of the saturating transformers were connected in series so that they created a single phase power output.

These static devices, known as static frequency multipliers or static frequency triplers, operated by saturating the cores of the transformers, which would cause harmonic flux fields around the cores. These flux fields were then used to induce harmonic currents in the secondary windings. The predominant current in the secondary windings was a third harmonic current caused by the flux field of the third harmonic of the incoming current. This predominant third harmonic current in each secondary winding created the desired single phase power. Such static devices were not completely successful because when the third harmonic flux field was created in the saturating transformers, a great number of other harmonic flux fields were also created. These harmonic flux fields caused harmonic currents which were reflected into the primary windings of the saturating transformers and, from there, into the source of multiphase power. These reflected harmonic currents drastically reduced the power factor of the incoming power which reduction in the power factor required installation of auxiliary equipment or the payment of a premium for the incoming power.

In an attempt to overcome the disadvantages caused by the many harmonic currents generated in the known static converting devices, it has become common practice to provide inductive components, in the form of choke coils, between the static converting device and the source of the incoming power so that the coils would isolate the source of the incoming power from the harmonic currents being reflected from the saturating transformers. This arrangement did eliminate some of the harmonic currents from being reflected into the incoming multiphase power source; however, the choke coils could not perform this function with sufficient efficiency to correct the power factor of the system to unity which is necessary for economical use of the multiphase incoming power. In an attempt to correct the power factor of said multiphase incoming power, the usual scheme of placing power factor correcting capacitors between the phases of the multiphase incoming power leads has been tried; however, this has not been successful.

The present invention is directed toward a static system for converting a multiphase power of a known frequency into a single phase power having a higher frequency which system does not have the disadvantages concomitant with the previous systems wherein the unused harmonic flux fields in the saturating transformers caused harmonic currents which resulted in power factor correcting difficulties.

In accordance with the present invention there is provided a system for converting electrical power from a multiphase source of known frequency into a single phase electrical power, wherein each phase of the source includes a primary circuit with the circuits connected at a common point. This system comprises a saturating transformer for each primary circuit and having a primary winding in that circuit; a non-saturating inductance in each primary circuit, these inductances each forming a blocking choke in the primary circuits; secondary windings on the transformers and in electrical series with each other to form a single phase output circuit; and, a separate wide band wave trap in each of the primary circuits, the wave traps being located between the primary windings and the inductances and being tuned to attenuate low order harmonics of the known frequency whereby the inductances are subjected to primarily the known frequency and high order harmonics thereof.

The primary object of the present invention is the provision of a system for converting a multiphase electrical power of known frequency into a single phase electrical power including saturating transformers in each of the phases of the multiphase power which system prevents random flow of harmonic currents from the saturating transformers to the source of the multiphase power.

Still another object of the present invention is the provision of the system as defined above which includes harmonic trap circuits or equivalent wide band filters for attenuating the flow of unwanted harmonic currents.

Still another object of the present invention is the provision of a system for converting a multiphase electrical power of known frequency into a single phase electrical power including harmonic attenuating devices in each phase of the multiphase electrical power which system allows selection of the harmonic attenuating devices independently of any power factor correcting components so that the harmonic attenuating devices and the power factor correcting components can each be selected for optimum operating characteristics for the primary purpose for which they are intended.

Still another object of the present invention is the provision of a system as defined above which includes harmonic trap circuits or equivalent wide band filters for attenuating unwanted harmonic currents which trap circuits are substantially independent of power factor correcting capacitors connected between the phases of the source of the multiphase power.

FIGURE 5 is a wiring diagram illustrating, somewhat schematically, still a further modification of the preferred embodiment as shown in FIGURE 1.

Figure 1:
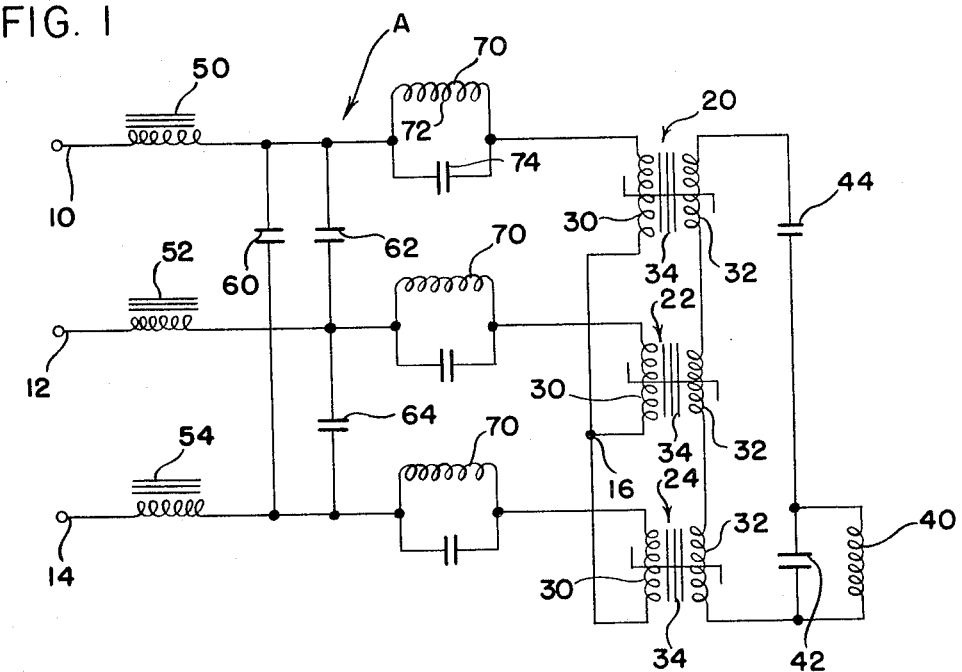
FIGURE 1 is a wiring diagram illustrating, somewhat schematically, the preferred embodiment of the present invention.
Figure 2:
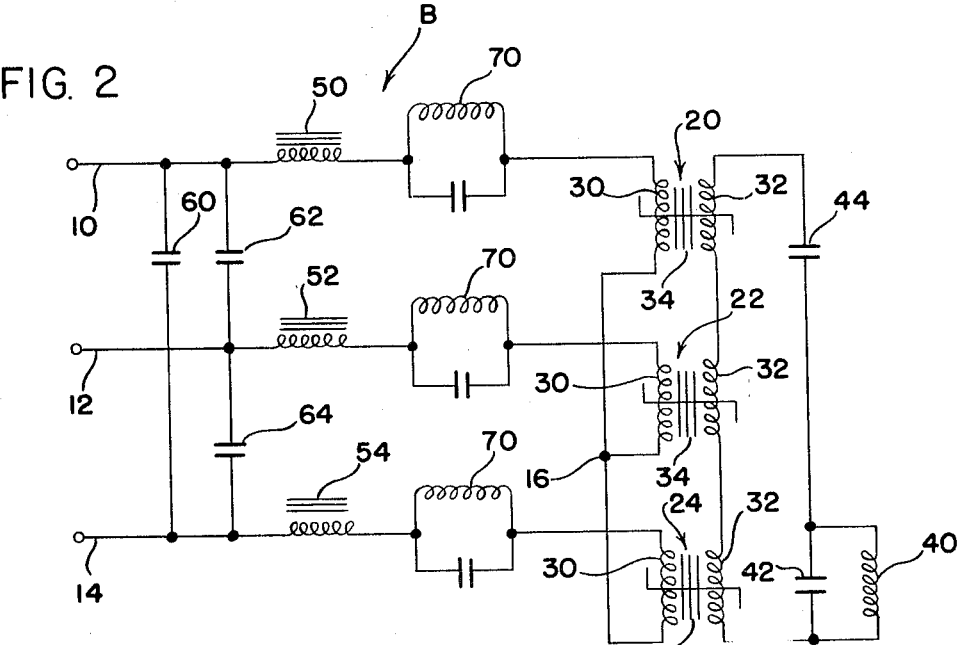
FIGURE 2 is a wiring diagram illustrating, somewhat schematically, a slight modification of the preferred embodiment illustrated in FIGURE 1.

Referring now to the drawings, wherein the showings are for the purpose of illustrating preferred embodiments of the invention only and not for the purpose of limiting same, FIGURES 1 and 2 show similar systems A and B, respectively, which systems are adapted to convert a multiphase electrical power from a source connected onto incoming power lines 10, 12 and 14 into a single phase electrical power. Systems A and B are substantially identical except for a minor modification to be explained later; therefore, only system A will be described in detail and it is appreciated that the description applies equally to system B. System A includes a common point 16 for the multiphase incoming power and a plurality of saturating transformers 20, 22 and 24 each of which are placed within one phase of the incoming multiphase power. In accordance with the invention, the saturating transformers are substantially identical and each of them comprise a primary winding 30, a secondary winding 32 and a saturable core 34 which core may be formed from a plurality of known easily saturated core materials.

In accordance with the preferred embodiment of the present invention, the material forming the cores 34 of the saturating transformers is characterized as a material having a substantially rectangular saturation curve. Such material is known to be highly efficient because there is a substantial reduction in the heat losses of the core material during fluctuation of exciting currents. Although this higher efficiency material is preferred, it produces successive harmonic currents having a higher magnitude than present when utilizing a core material having a gradually sloping magnetization curve. These high magnitude harmonic currents have heretofore caused serious deficiencies in the known static converter systems of the type to which the present invention is directed.

The primary windings 30 of the saturating transformers are connected into the separate phases determined by incoming lines 10, 12 and 14 and between these lines and the common point 16. The lines 10, 12 and 14 each form a separate primary circuit of the converting systems A and B, and a winding 30 is located in each of these primary circuits. In contrast to the multiphase connection of the primary windings, the secondary windings 32 are connected in electrical series so that they provide a single phase power supply which can be connected onto a load 40, which, in accordance with the illustrated embodiment of the present invention, comprises the heating coil for an induction melting furnace. It is appreciated that various loads can be driven by the single phase output of the secondary windings.

Referring now in more detail to the secondary or load circuit including the load 40, there is provided a power factor correcting capacitor 42 connected in parallel with the load 40 and combining with a capacitor 44 to match the impedance of the load circuit with the apparent impedance of the secondary circuit of the saturating transformers.

To isolate incoming lines 10, 12 and 14 from the harmonic currents generated by the saturating transformers 20, 22 and 24, each of the lines 10, 12 and 14 is provided with a non-saturating inductance such as choke coil 50, 52, or 54, which choke coils are so constructed that they will not be saturated by a current within the range created in the system A. Such a non-saturating choke coil can take various physical forms, such as a coil with an air gap in the core or a coil with a complete air core. These choke coils also prevent an increase in current when these secondary windings of the saturating transformers become saturated.

As is common practice, capacitors 60, 62 and 64 are placed between the phases of the incoming multiphase power to correct the power factor of the power source. The capacitive reactance of these capacitors is determined by the amount of inductive reactance present in the electric converting system. It is also possible to provide a plurality of capacitors between each phase of the multiphase incoming power so that the capacitors may be selectively inserted into the circuit to compensate for variations in the operating characteristics of the electrical converting system. Phase-to-phase capacitors for correcting the power factor of a three phase electrical device have been known for a considerable time and the placement of these capacitors may be between the saturating transformers and the choke coils as in system A or between the choke coils and the incoming lines 10, 12 and 14 as in system B.

In operation of the power converting systems shown in FIGURES 1 and 2, the multiphase power source feeding leads 10, 12 and 14 causes cores 34 of the saturating transformers to alternately saturate in both the positive and the negative directions which saturation sets up balanced harmonic flux fields which cause harmonic currents to flow in the secondary windings 32 of the saturating transformers. The harmonic currents in the secondary windings are each a multiple of 3 of the fundamental incoming frequency, i.e. the currents are the 3rd, 9th, 15th, and 21st, etc. harmonics. The other odd harmonic currents which are not multiples of 3 of the fundamental, are cancelled and are reflected back into the primary windings of the saturating transformers. Because of the 120° phase shift in the primary windings, the harmonic currents flowing in the secondary windings cannot flow in the primary windings. Accordingly, in the primary windings the only harmonic currents present are the odd harmonic currents which are not multiples of 3, i.e. the 5th, 7th, 11th, 13th, 17th, 19th, etc. Consequently, the current flow in the secondary windings is predominantly third harmonic current because the 9th, 15th, and succeeding multiples of 3 of the fundamental, are relatively small currents in comparison to the third harmonic current. However, in the primary windings, the 5th and 7th harmonic currents are present and these harmonic currents cause a secondary current flow in the primary side of the converting system which secondary current flow makes it difficult to correct the power factor of the converting system. When high efficiency core material is used in cores 34, the 5th and 7th harmonic currents are extremely high in comparison with the third harmonic currents and cause considerable difficulty in the multiphase power source. Since these harmonic currents are of high magnitude, they cannot be easily attenuated by any power factor correcting capacitors or choke coils. As so far described, the static power converting systems shown in FIGURES 1 and 2 do not depart from the prior art and they exhibit the deficiency of the prior art in that the power factor of the incoming power cannot be corrected to approximately unity because of the presence of the 5th, 7th, 11th, 13th and other harmonic currents.

In accordance with the present invention, the system A is provided with wave trap or an equivalent wide band filtering means 70 positioned between the saturating transformers and the choke coils which wave traps may take a variety of structural embodiments; however, in accordance with the preferred embodiment of the present invention, these wave trap means are tank circuits including inductance 72 and capacitance 74 as shown in FIGURE 1. The values of the capacitance and inductance is such that the circuit is tuned at approximately 400 c.p.s. when the fundamental of the incoming power is 60 cycles. The quality factor of the tank circuits is relatively low so that the tank circuits have a relatively flat frequency response which indicates that the tank circuits will attenuate currents having frequencies extending over a wide band of frequencies centered around 400 c.p.s. Accordingly, the wave trap means 70 will be resonant between approximately 300 c.p.s. and 500 c.p.s. if the fundamental of the incoming power is 60 cycles. Stated in another way, the wave trap means will be resonant when subjected to currents having a frequency of between 300 and 500 c.p.s. which will attenuate the 5th and 7th harmonic currents in the primary windings of the transformers. Consequently, these wave trap means can be broadly defined as attenuating the lower order harmonic currents within the primary side of the converting system. The higher order harmonic currents in the primary side of the converting system, which broadly speaking are the 11th, 13th, 17th, 19th, etc. harmonic currents, are not attenuated by the wave trap means 70 although it is appreciated that they can be so attenuated by another wave trap means positioned in series with means 70. However, these higher order harmonic currents have sufficiently reduced magnitudes. They can be somewhat attenuated by the power factor correcting capacitors 60, 62 and 64 so that they are substantially prevented from being reflected into the incoming power source. Accordingly, although these harmonic currents may cause some difficulty in power factor correcting, the power factor can be corrected to a value in the range of .85–.90 which is considered extremely satisfactory for a static frequency converter of the type to which the present invention is directed.

The wave trap means 70 is constructed to attenuate the lower order magnitude harmonic currents in the primary side of the system so that the only harmonic currents flowing from the primary windings toward the incoming power source are the higher order harmonics which, as is known, have a substantially reduced magnitude and cause less difficulty in correcting the power factor of the system. In this manner, the power factor correcting capacitors can be selected to provide the power factor correcting feature for the system without taking into consideration the high harmonic current flows of the 5th and 7th harmonic currents. Consequently, the tank circuits and the power factor correcting capacitors may be selected for their primary functions, that is, attenuating the higher order harmonic currents and correcting the power factor of the system, respectively.

Figure 3:
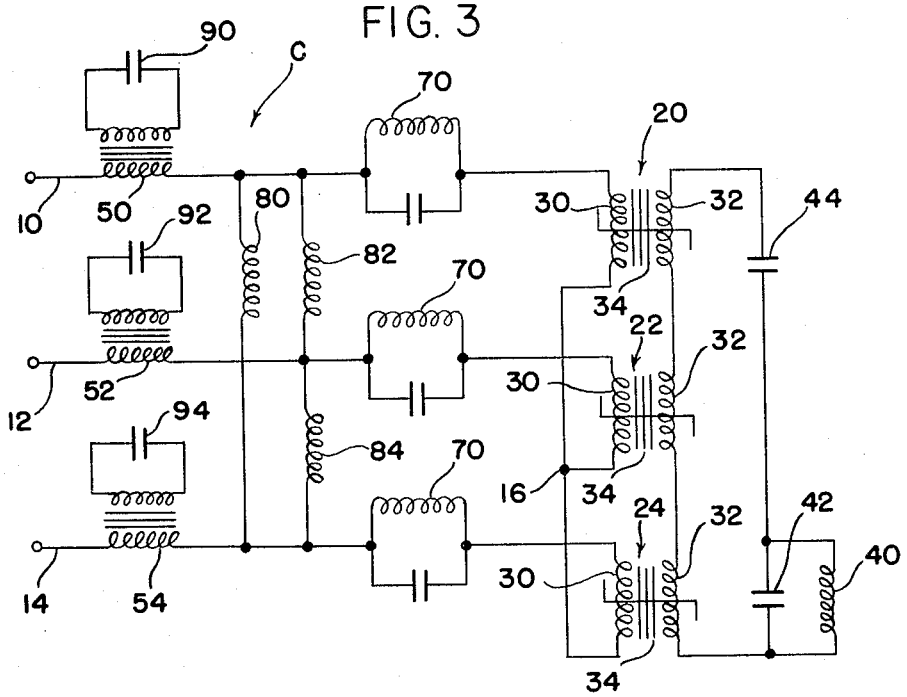
FIGURE 3 is a wiring diagram illustrating, somewhat schematically, still a further modification of the preferred embodiment as shown in FIGURE 1.

Referring now to FIGURE 3, a modification of the preferred embodiment of the present invention is disclosed wherein system C includes phase-to-phase inductance coils 80, 82 and 84 to provide the balancing connection between the separate phases of the incoming power. To correct the power factor of the system, each choke coil, 50, 52 and 54 is provided with an inductively coupled capacitor 90, 92 and 94, respectively, which capacitors coact with the other components of the system to correct the power factor thereof. In effect, shunt coils 80, 82 and 84 may also be resonated with the capacitive reactance of coils 50, 52 and 54. It is also appreciated that by providing the transformer coupled capacitors on the choke coils, that these circuits can more easily attenuate the higher order harmonic currents and isolate the incoming power source from the currents in the range of the 11th, 13th, 17th, 19th, etc., harmonics.

Figure 4:
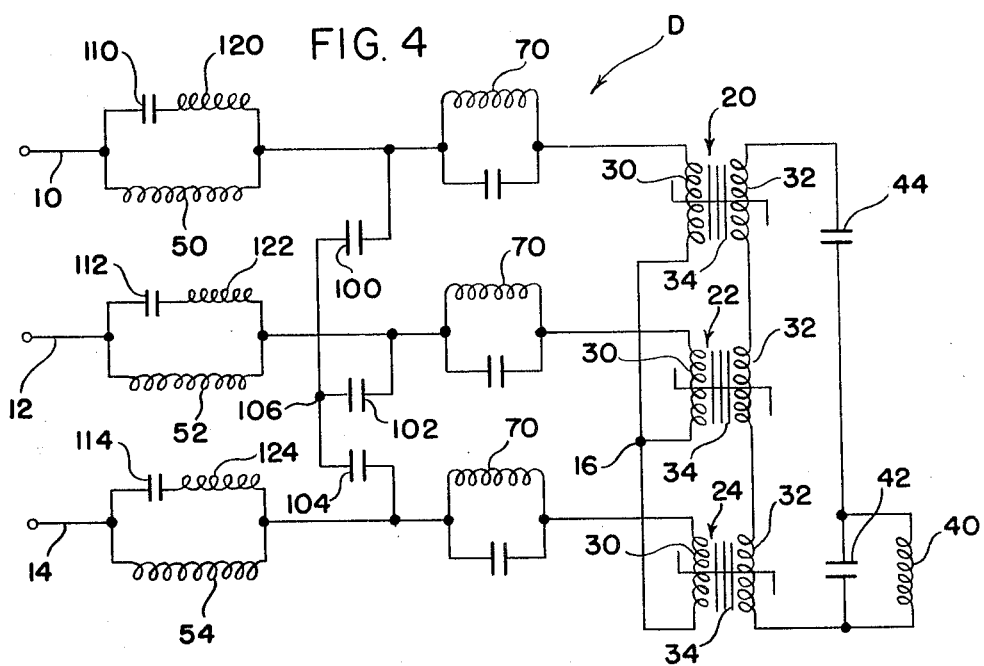
FIGURE 4 is another wiring diagram illustrating, somewhat schematically, yet another modification of the preferred embodiment as shown in FIGURE 1.

Referring now to FIGURES 4 and 5, systems D and E are illustrated which systems are slight modifications of the preferred embodiment of the present invention as shown in FIGURES 1 and 2 and include a Y connection for the power factor correcting capacitors 100, 102 and 104 which Y connections include a common or floating neutral 106. The systems D and E differ from each other by the placement of the power factor correcting capacitors with respect to the choke coils 50, 52 and 54. To better attenuate the higher order harmonic currents within the primary circuit of the systems, there is provided in parallel with the choke coils capacitors 110, 112 and 114, respectively, which capacitors form the tank circuits with the choke coils. To prevent by-passing of the choke coils by the higher frequency currents, the capacitors are provided with blocking coils 120, 122 and 124 which coils are included within the tank circuits and prevent the capacitors from providing a low impedance path for the high frequency harmonic currents in the primary side of the converter systems.

It is appreciated that the present invention provides a wave trap means for attenuating the lower order, higher magnitude harmonics in the primary circuits of the static converting systems so that the other components of the systems may be so proportioned to direct their primary function to the power factor correcting aspects of the circuit.

It is appreciated that the present invention has been discussed in connection with certain structural embodiments; however, various modifications may be made in these embodiments without departing from the intended spirit and scope of the present invention as defined by the appended claims.

Having thus described my invention, I claim:

1. A system for converting electrical power from a multiphase source of known frequency into a single phase electrical power, each phase of said source including a primary circuit with said circuits joined at a common point, said system comprising, in combination: a saturating transformer for each primary circuit and having a primary winding in that circuit; a non-saturating inductance in each primary circuit, said inductances each forming a blocking choke in said primary circuits; secondary windings on said transformers and in electrical series with each other to form a single phase output circuit; and, a separate wide band wave trap in each of said primary circuits, said wave traps being located between said primary windings and said inductances and being tuned to attenuate low order harmonics of said known frequency whereby said inductances are subjected to primarily said known frequency and high order harmonics thereof.

2. A system as defined in claim 1 wherein said multiphase source is a three phase source, said known frequency is 60 cycles per second, said low order harmonics are at least the 5th and 7th harmonic currents of said known frequency.

3. A system as defined in claim 1 including phase-to-phase power factor correcting capacitors connected between said primary circuits.

4. A system as defined in claim 1 wherein each of said inductances are shunted by a circuit including a capacitor and an inductor.

References Cited by the Examiner

UNITED STATES PATENTS

| 2,008,515 | 7/1935 | Plather et al. | 321—9 |
| 2,210,384 | 8/1940 | Rust et al. | 333—76 |
| 3,038,113 | 6/1962 | Kusko | 333—76 |
| 3,040,230 | 6/1962 | Biringer | 321—7 |
| 3,040,231 | 6/1962 | Biringer | 321—7 |

FOREIGN PATENTS 291,529   6/1928   Great Britain.

JOHN F. COUCH, *Primary Examiner.*

W. H. BEHA, *Assistant Examiner.*